(12) United States Patent
Akiyoshi et al.

(10) Patent No.: US 9,321,653 B2
(45) Date of Patent: Apr. 26, 2016

(54) PROCESS FOR PRODUCING TRICHLOROSILANE

(75) Inventors: Ayao Akiyoshi, Shunan (JP); Tadashi Aimoto, Shunan (JP)

(73) Assignee: TOKUYAMA CORPORATION, Shunan-Shi (JP)

( * ) Notice: Subject to any disclaimer, the term of this patent is extended or adjusted under 35 U.S.C. 154(b) by 150 days.

(21) Appl. No.: 13/576,690

(22) PCT Filed: Feb. 9, 2011

(86) PCT No.: PCT/JP2011/052683
§ 371 (c)(1),
(2), (4) Date: Aug. 2, 2012

(87) PCT Pub. No.: WO2011/102265
PCT Pub. Date: Aug. 25, 2011

(65) Prior Publication Data
US 2012/0301385 A1 Nov. 29, 2012

(30) Foreign Application Priority Data
Feb. 18, 2010 (JP) .................. 2010-033686

(51) Int. Cl.
*C01B 33/08* (2006.01)
*C01B 33/107* (2006.01)

(52) U.S. Cl.
CPC ....... *C01B 33/10763* (2013.01); *C01B 33/1071* (2013.01)

(58) Field of Classification Search
USPC .................................... 423/342, 341
See application file for complete search history.

(56) References Cited

U.S. PATENT DOCUMENTS

| 4,613,491 A | * | 9/1986 | Jung .................... B01J 31/0274 423/342 |
| 2004/0052716 A1 | | 3/2004 | Wakamatsu et al. |
| 2004/0062716 A1 | * | 4/2004 | Dugger, III .......... A61K 9/0056 424/45 |
| 2009/0297708 A1 | * | 12/2009 | Tebakari ............... C01B 33/035 427/255.17 |

FOREIGN PATENT DOCUMENTS

| CA | 2185981 A1 | 3/1997 |
| CN | 1157259 A | 8/1997 |
| CN | 1478057 A | 2/2004 |
| JP | 56-73617 A | 6/1981 |
| JP | 9-118512 A | 5/1997 |
| JP | 3324922 B2 | 9/2002 |
| JP | 3708648 B2 | 10/2005 |
| JP | 2009-96678 A | 5/2009 |
| JP | 2010-6689 A | 1/2010 |

OTHER PUBLICATIONS

International Search Report issued in PCT/JP2011/052683 mailed Apr. 5, 2011.

* cited by examiner

*Primary Examiner* — James McDonough
(74) *Attorney, Agent, or Firm* — Birch, Stewart, Kolasch & Birch, LLP

(57) ABSTRACT

[Problems] To provide a process for efficiently producing trichlorosilane on an industrial scale by efficiently reusing the waste gas of after trichlorosilane is separated by condensation from the gas that is formed by the reaction of metallic silicon with hydrogen chloride.
[Means for Solution] A process for producing trichlorosilane, including, independently from each other, a first production process for forming trichlorosilane by reacting metallic silicon with hydrogen chloride and a second production process for forming trichlorosilane by reacting metallic silicon with tetrachlorosilane and hydrogen; wherein trichlorosilane and other chlorosilane compounds are separated by condensation from trichlorosilane-containing gases formed by reaction in the first production process, and the waste gas from which trichlorosilane and other chlorosilane compounds have been separated by condensation is fed as a hydrogen source to the second production process.

2 Claims, No Drawings

PROCESS FOR PRODUCING TRICHLOROSILANE

TECHNICAL FIELD

This invention relates to a process for producing trichlorosilane. More specifically, the invention relates to a process for producing trichlorosilane, including two different production processes, i.e., a process for producing trichlorosilane by reacting metallic silicon with hydrogen chloride, and a process for producing trichlorosilane by reacting metallic silicon with tetrachlorosilane and hydrogen.

BACKGROUND ART

Trichlorosilane ($SiHCl_3$) is a compound useful as a starting material for the production of polysilicon. Upon reacting trichlorosilane with hydrogen at a temperature as high as 1000° C. or more, polysilicon precipitates in a highly pure form. This reaction is expressed, chiefly, by the following formulas (1) and (2), $$4SiHCl_3 \rightarrow Si + 3SiCl_4 + 2H_2 \qquad (1)$$

$$SiHCl_3 + H_2 \rightarrow Si + 3HCl \qquad (2)$$

Trichlorosilane is, usually, produced by reacting metallic silicon with hydrogen chloride. For example, a patent document 1 discloses a process for producing trichlorosilane by reacting metallic silicon with hydrogen chloride in the presence of a catalyst containing iron and aluminum by using a fluidized bed-reaction apparatus.

According to the above production process, trichlorosilane is formed from metallic silicon and hydrogen chloride by the reaction of the following formula (3), $$Si + 3HCl \rightarrow SiHCl_3 + H_2 \qquad (3)$$

On the other hand, tetrachlorosilane ($SiCl_4$) by-produced at the time of producing polysilicon can be converted into trichlorosilane and can be reused for the production of polysilicon. For instance, a patent document 2 discloses a process for producing trichlorosilane by reacting metallic silicon, tetrachlorosilane and hydrogen in a fluidized bed in the presence of a copper silicide catalyst. According to this production process, trichlorosilane is formed from metallic silicon, tetrachlorosilane and hydrogen according to the following reaction formula (4), $$3SiCl_4 + 2H_2 + Si \rightarrow 4SiHCl_3 \qquad (4)$$

This production process, however, has such defects as requiring a reaction temperature higher than that of the trichlorosilane producing process according to the above formula (3), low reaction rate and high cost of production. Therefore, trichlorosilane has been produced chiefly by the reaction of metallic silicon with hydrogen chloride (reaction of the formula (3)), while the production process of the formula (4) is carried out additionally for reusing tetrachlorosilane that is by-produced in the production of polysilicon.

Here, the process for producing trichlorosilane by the reaction of metallic silicon with hydrogen chloride (reaction of the formula (3)) is accompanied by the side reaction of the following formula (5) forming, as by-products, tetrachlorosilane and dichlorosilane in trace amounts, $$Si + 4HCl \rightarrow SiCl_4 + 2H_2 \qquad (5)$$

Therefore, a gas formed by the reaction of metallic silicon with hydrogen chloride is cooled down to −10° C. or lower to separate trichlorosilane by condensation. Here, the condensed solution also contains other chlorosilane compounds which are by-produced in addition to trichlorosilane. This trichlorosilane is separated and recovered by distillation from the condensed solution that contains these chlorosilane compounds, and trichlorosilane which is recovered is used as a starting material for producing polysilicon. Further, tetrachlorosilane that is separated by distillation is chiefly reused for the process for producing trichlorosilane that is additionally conducted relying upon the reaction of the formula (4).

The waste gas after chlorosilanes are separated by condensation from gases formed by the reaction comprises chiefly hydrogen but still contains unreacted hydrogen chloride, chlorosilane compounds that are remaining in small amounts without being separated by condensation as well as trace amounts of boron and the like that are unavoidably contained as impurities in metallic silicon. The impurities lower the quality of polysilicon. Therefore, trichlorosilane used as the starting material for producing polysilicon must not contain impurities as much as possible. Because of this reason, the waste gas containing impurities was partly recirculated as a carrier gas into the reaction system of metallic silicon and hydrogen chloride but was mostly disposed of through a suitable treatment.

However, the amount of the waste gas to be disposed of after chlorosilane compounds are separated is on the increase accompanying an increase in the amount of production of trichlorosilane, and it has been urged to establish a method of effectively reusing the waste gas.

On the other hand, a patent document 3 is proposing a process for producing trichlorosilane by feeding granular metallic silicon, hydrogen chloride, tetrachlorosilane (silicon tetrachloride) and hydrogen into a fluidized bed reactor filled with granular metallic silicon so that there simultaneously proceed a trichlorosilane-forming reaction of metallic silicon with hydrogen chloride (reaction of the formula (3)) and a trichlorosilane-forming reaction due to the reaction of metallic silicon, tetrachlorosilane and hydrogen (reaction of the formula (4)).

PRIOR ART DOCUMENTS

Patent Documents

Patent document 1: JP 3324922 B
Patent document 2: JP 3708648 B
Patent document 3: JP-A-56-73617

OUTLINE OF THE INVENTION

Problems that the Invention is to Solve

According to the process for producing trichlorosilane proposed by the above patent document 3, the two chlorosilane-forming reactions proceed simultaneously in the same reaction container offering an advantage in that tetrachlorosilane and hydrogen, which are by-produced in the one reaction (reaction of metallic silicon with hydrogen chloride according to the formula (3)), are consumed by the other reaction for forming trichlorosilane making it possible to very suppress the formation of the waste gas. Further, the waste gas that is formed can be circulated into the reactor to effectively solve the problem of waste gas that generates in large amounts.

According to the above process, however, the two reactions must be simultaneously conducted under different reaction conditions and are inevitably accompanied by such a problem that the conversion into trichlorosilane is low.

In the reaction of metallic silicon with hydrogen chloride for forming trichlorosilane according to the above formula, for example, the conversion into trichlorosilane decreases with an increase in the reaction temperature and, besides, the reaction is exothermic. When trichlorosilane is produced according to the formula (3), the reaction temperature has heretofore been set to lie in a range of 250 to 400° C.

In the reaction of the tetrachlorosilane, metallic silicon and hydrogen for forming trichlorosilane according to the formula (4), on the other hand, the reaction temperature has heretofore been set to lie in a range of 400 to 700° C. and, preferably, 450 to 600° C. to maintain a suitable reaction rate and selectivity.

It will, therefore, be learned that when the two reactions are simultaneously conducted in the same reaction vessel, the reaction temperature that is set to meet the one reaction causes a decrease in the conversion of the other reaction. After all, the reaction temperature is set to be near the boundary region between the two reactions (about 400° C.) which is not in an optimum range for either reaction. Accordingly, neither reaction can be conducted under optimum conditions.

In simultaneously conducting the trichlorosilane-forming reaction according to the formula (3) and the trichlorosilane-forming reaction according to the formula (4), further, the conditions are set or adjusted with very difficulty due to the reaction that by-produces hydrogen and the reaction that consumes hydrogen. For example, feeding hydrogen permits the reaction of the formula (4) to proceed while consuming hydrogen. On the contrary, the reaction of the formula (3) that by-produces hydrogen is suppressed from forming trichlorosilane. When the two reactions are simultaneously conducted in the same vessel, therefore, feed of hydrogen must be controlled very strictly. Otherwise, it becomes difficult to efficiently obtain trichlorosilane in high yields. However, the amount of the hydrogen consumption or the amount of the hydrogen formation often varies due to variation in the reaction temperature and the like. Therefore, the amount of hydrogen fed to the reactor must be adjusted depending upon the variation in the reaction temperature and the like while strictly monitoring the reaction temperature and the like. More than that, the two reactions proceed at different rates; i.e., the trichlorosilane-forming reaction according to the formula (3) proceeds at a high rate while the trichlorosilane-forming reaction according to the formula (4) proceeds at a low rate. It will, therefore, be learned that it is very difficult to so adjust the amount of feeding hydrogen that these reactions proceed maintaining a constant balance at all times.

As described above, it is very difficult to practically carry out, on an industrial scale, the process of the patent document 3 which simultaneously conducts the trichlorosilane-forming reaction according to the formula (3) and the trichlorosilane-forming reaction according to the formula (4) in the same reaction vessel. After all, it has now been desired to put into practical use the above-mentioned process that effectively reuses the waste gas.

In producing trichlorosilane by reacting metallic silicon with hydrogen chloride, therefore, it is an object of the present invention to efficiently produce trichlorosilane on an industrial scale by efficiently reusing the waste gas of after trichlorosilane has been separated by condensation from gases that are formed by the reaction.

Means for Solving the Problems

The present inventors have forwarded the study in an effort to reuse the above-mentioned waste gas chiefly comprising hydrogen, have discovered that the waste gas can be directly used as a hydrogen source for a process for producing trichlorosilane by reacting metallic silicon, tetrachlorosilane and hydrogen without the need of subjecting the waste gas to a special refining or to a separation/recovery treatment without adversely affecting the quality of trichlorosilane that is formed, and have thus completed the present invention.

Namely, according to the present invention, there is provided a process for producing trichlorosilane, including, independently from each other, a first production process for forming said trichlorosilane by reacting metallic silicon with hydrogen chloride and a second production process for forming said trichlorosilane by reacting metallic silicon with tetrachlorosilane and hydrogen; wherein said trichlorosilane and other chlorosilane compounds are separated by condensation from trichlorosilane-containing gases formed by reaction in said first production process, and waste gases from which said trichlorosilane and other chlorosilane compounds have been separated by condensation is fed as a hydrogen source to the second production process.

In the invention, it is desired that the amount of metallic silicon used in the first production process is set to be larger than the amount of metallic silicon used in the second production process.

Effects of the Invention

In the process for producing trichlorosilane of the present invention, there are separately executed a first production process for forming trichlorosilane by reacting metallic silicon with hydrogen chloride (reaction of the formula (3)) and a second production process for forming trichlorosilane by reacting metallic silicon with tetrachlorosilane and hydrogen (reaction of the formula (4)). Here, a novel feature resides in that the waste gas that remains after trichlorosilane and other chlorosilane compounds are separated by condensation from the trichlorosilane-containing gas formed by the reaction in the first production process, is directly fed as a hydrogen source to the second production process.

The components other than hydrogen contained in the waste gas are chlorosilanes such as tetrachlorosilane and dichlorosilane, and boron and the like stemming from metallic silicon. Here, however, tetrachlorosilane is used as a reaction species in the second production process and causes no problem at all even if it is introduced together with hydrogen into the reaction system in the second production process. Further, even if other chlorosilane compounds such as dichlorosilane and the like are mixed into the gas formed by the reaction, they can be separated by condensation together with trichlorosilane that is formed, and can be separated from trichlorosilane upon distilling the condensed solution. Besides, there is quite no problem even if boron and the like contained in the exhaust gas are fed into the reaction system in the second production process. This is because, boron and the like contained in the waste gas are the components unavoidably contained as impurities in metallic silicon that is used as reaction species in the first production process, and their amounts in the waste gas are very small. Besides, the second production process, too, uses metallic silicon as the reaction species; i.e., the second production process is so executed that boron and the like stemming from metallic silicon are separated from trichlorosilane that is formed. For instance, upon condensing the gas formed by the reaction in the second production process, trichlorosilane is separated from boron and the like. Moreover, the second production process is so executed as to recover trichlorosilane of a high purity free of boron or the like by distilling the condensed solution containing trichlorosilane.

According to the present invention, therefore, the waste gas comprising chiefly hydrogen generated in the first production process can be directly fed as a hydrogen source to the second production process without the need of any special refining treatment. Besides, the second production process, too, can be executed in a customary manner without adding any special or new refining apparatus.

Further, the greatest advantage of the present invention is that the waste gas generated in the first production process can be all fed to the second production process so as to be reused and, at the same time, most of hydrogen used in the second production process can be supplied by the waste gas making it possible to greatly decrease the amount of use of hydrogen (hereinafter called other hydrogen) other than hydrogen contained in the waste gas and to greatly decrease the cost of production.

As described above, the reaction of the first production process is represented by the following formula (3), $$Si + 3HCl \rightarrow SiHCl_3 + H_2 \tag{3}$$

and one mole of hydrogen is formed per mole of metallic silicon.

As described above, on the other hand, the reaction of the second production process is represented by the following formula (4), $$3SiCl_4 + 2H_2 + Si \rightarrow 4SiHCl_3 \tag{4}$$

and 2 moles of hydrogen is consumed per mole of metallic silicon.

It is, therefore, desired to use metallic silicon in the first production process in an amount larger than the amount of metallic silicon used in the second production process; i.e., the ratio of the waste gas contained in hydrogen (ratio of using the waste gas) used in the second production process increases with an increase in the amount of metallic silicon used in the first production process. For instance, if the amount of metallic silicon used in the first production process is set to be not less than 1.8 times as large as that of the second production process, then hydrogen that is used can be mostly supplied by the waste gas and if the amount thereof is set to be not less than 2 times as great, then hydrogen that is used can be all supplied by the waste gas.

Mode for Carrying Out the Invention

The present invention conducts in parallel the processes for producing trichlorosilane based upon different forming reactions, i.e., conducts in parallel the first production process and the second production process. Namely, the reaction for forming trichlorosilane in the first production process and the reaction for forming trichlorosilane in the second production process are separately and independently conducted in different reaction vessels, and the waste gas generated in the first production process is used as a hydrogen source in the second production process.

<First Production Process>

In the first production process, metallic silicon is reacted with hydrogen chloride to form trichlorosilane. As described already, this forming reaction is represented by the following formula (3), $$Si + 3HCl \rightarrow SiHCl_3 H_2 \tag{3}$$

accompanied, however, by a side reaction which by-produces tetrachlorosilane as represented by the following formula (5), $$Si + 4HCl \rightarrow SiCl_4 + 2H_2 \tag{5}$$

and, further, by-produces dichlorosilane though the amount thereof is very small.

1. Metallic Silicon:

As metallic silicon used for the above reaction, there can be used metallurgically formed metallic silicon, ferrosilicon, or a solid substance containing silicon element in a metallic state, such as polysilicon, which have been known without any limitation. There is no specific limitation, either, on the components and contents of impurities such as iron compound and the like contained in metallic silicon. Metallic silicon is used in the form of fine powder having an average grain size of, usually, about 100 to about 300 μm.

Metallic silicon containing boron in an amount of, usually, about several ppm to several hundred ppm is industrially available and can be used in the production process of the present invention without any particular limitation. At the time of separating chlorosilane compounds by condensing the gas formed by the reaction, however, boron is taken in by the chlorosilane compounds. If metallic silicon having a too large boron content is used, therefore, boron is contained in an increased amount in the chlorosilane compounds that are separated causing a decrease in the efficiency of distillation or causing an increased load on the distilling plant. In the production process of the present invention, therefore, it is desired that the metallic silicon that is used contains boron in an amount of several to a hundred ppm and, more preferably, several to 50 ppm.

2. Hydrogen Chloride:

There is no particular limitation on hydrogen chloride that is used for the reaction with metallic silicon despite it contains hydrogen and the like. In general, however, the chlorosilane compounds such as trichlorosilane, tetrachlorosilane and dichlorosilane are highly hydrolizable and, therefore, undergo the reaction with water. Therefore, hydrogen chloride that contains water may lower the yield of trichlorosilane that is formed. It is, therefore, desired that hydrogen chloride is in a dry state.

3. Reaction of Metallic Silicon with Hydrogen Chloride:

From the standpoint of producing trichlorosilane maintaining good efficiency, it is desired to conduct the reaction of metallic silicon with hydrogen chloride by using a catalyst. As such a catalyst, there can be used, without any particular limitation, a catalyst component that has been widely known and used in the reaction of metallic silicon with the hydrogen chloride.

Concrete examples of such a catalyst component include metals of the Group VIII, such as iron, cobalt, nickel, palladium, and platinum, as well as chlorides thereof, and metals such as aluminum, copper and titanium as well as chlorides thereof. These catalysts can be used alone or in a combination of a plurality of kinds. There is no specific limitation on the amount of the catalyst component that is used provided trichlorosilane can be produced maintaining good efficiency, and the amount thereof may be suitably determined by taking the capacity of the production apparatus and the like into consideration. Generally, however, it is sufficient if the catalyst component is used in an amount, calculated as a metal element, of 0.05 to 40% by weight and, specifically, 0.1 to 5% by weight relative to metallic silicon.

The catalyst component may be made present by adding it into the reaction system. When metallic silicon that is used contains the catalyst component such as iron compound and the like as impurities, however, the impurities can be effectively utilized as the catalyst component. When metallic silicon containing catalyst components as impurities is used, too, there is no problem even if the catalyst components are, further, added into the reaction system in an attempt to improve reactivity between the metallic silicon and hydrogen chloride.

The reaction of metallic silicon with hydrogen chloride can be conducted by using any known reactor without limitation. As the reactor, there can be concretely exemplified a fixed bed type reactor and a fluidized bed type reactor. Of the above reactors, it is desired to use the fluidized bed type reactor from such standpoints that trichlorosilane can be continuously produced by continuously feeding metallic silicon and hydrogen chloride and that the heat of reaction can be efficiently removed since the above reaction is exothermic.

The reaction temperature in the reaction of metallic silicon with hydrogen chloride may be suitably determined by taking the material and capacity of the production apparatus into consideration. If the reaction temperature is unnecessarily high, however, the selectivity of trichlorosilane decreases causing an increase in the amounts of the by-produced chlorosilane compounds such as tetrachlorosilane and dichlorosilane other than trichlorosilane. Further, the reaction is exothermic. By taking these points into account, therefore, the reaction temperature is, usually, set to lie in a range of 250 to 400° C.

4. Condensation-Separation of Chlorosilane Compounds and Distillation:

A gas containing trichlorosilane is generated by the reaction of metallic silicon with hydrogen chloride. The gas, further, contains, in addition to trichlorosilane, the chlorosilane compounds such as tetrachlorosilane and dichlorosilane that are by-products, as well as by-produced hydrogen and boron and the like that are impurities unavoidably contained in metallic silicon.

In recovering trichlorosilane from the gas formed by the reaction (reaction formed gas), therefore, the reaction formed gas is, first, passed through a suitable filter to remove solid matters such as metallic silicon particles and is, thereafter, condensed so that the chlorosilane compounds inclusive of trichlorosilane are separated from the reaction formed gas.

In the step of separation by condensation, the reaction formed gas is cooled. Here, the cooling temperature may be such that the chlorosilane compounds are condensed and may be suitably determined by taking the cooling capacity of the cooling apparatus and the like into consideration. The lower the cooling temperature, the higher the effect for removing the chlorosilane compounds. Usually, however, it is sufficient if the cooling temperature is not higher than $-10°$ C. and, specifically, not higher than $-30°$ C. There is no specific limitation, either, on the pressure at the time of separation by condensation provided the chlorosilane compounds can be removed sufficiently, and the pressure may be suitably determined by taking the capacities of the condensing/removing apparatus into consideration. Usually, it is sufficient if the pressure is not lower than 300 kPaG and, specifically, not lower than 500 kPaG.

There is no particular limitation on the cooling means for effecting the condensation if it is capable of cooling the gas formed by the reaction down to the above-mentioned cooled temperature, and any known cooling means can be used. As such cooling means, there can be concretely exemplified cooling means which cools the reaction formed gas bypassing it through a heat exchanger that is cooled and cooling means which cools the reaction formed gas by using a condensed product that is cooled. These methods can be employed alone or in combination.

In order to elevate the pressure of the gas, further, it is allowable to install a pressure device prior to removing the chlorosilane compounds by condensation. In order to protect the pressure device, further, a chlorosilane pre-condensing device, a filter and the like may be installed on the upstream of the pressure device. These means can be employed as accepted means in designing the process on an industrial scale.

The condensed solution obtained by separation by condensation from the reaction formed gas, is a mixture of various kinds of chlorosilane compounds, and from which trichlorosilane is singled out by distillation. Then recovered trichlorosilane is used as a starting material for precipitation in the step of producing polysilicon.

The waste gas from which the chlorosilane compounds are separated by condensation contains a hydrogen gas as a chief component and, further, contains chlorosilane compounds that remain without being separated by condensation and unreacted hydrogen chloride in amounts of about several percent by volume, as well as phosphorus and boron stemming from metallic silicon though the amounts thereof are very small. The waste gas is fed as a hydrogen source to the second production process that will be described below.

<Second Production Process>

In the second production process, tetrachlorosilane ($SiCl_4$), metallic silicon and hydrogen are reacted together to produce trichlorosilane. As described earlier, the reaction for forming trichlorosilane is represented by the following formula (4),

$$3SiCl_4 + 2H_2 + Si \rightarrow 4SiHCl_3 \qquad (4)$$

The rate of reaction in this case is smaller than the rate of reaction of the above-mentioned formula (3) conducted in the first production process.

Though there is no specific limitation, tetrachlorosilane used for the reaction comprises tetrachlorosilane by-produced in the step of producing polysilicon from trichlorosilane, as well as tetrachlorosilane separated and recovered from trichlorosilane that is obtained by distilling the condensed solution containing chlorosilane compounds by-produced in the above first production process. Namely, due to its slow reaction rate, the second production process is conducted rather for effectively utilizing tetrachlorosilane by-produced in the step of producing polysilicon than for producing trichlorosilane.

Metallic silicon used for the above reaction is quite the same as the one used for the first production process; i.e., there can be used any known metallic silicon without limitation, such as metallurgically obtained metallic silicon, ferrosilicon, or solid substance containing element silicon in a metallic form, such as polysilicon. There is no specific limitation, either, on the components and contents of impurities such as iron compounds contained in metallic silicon. Metallic silicon, too, is used in the form of a fine powder having an average particle size of about 100 to about 300 µm. Moreover, the boron content in metallic silicon, too, is quite the same as that of metallic silicon used in the above first production process; i.e., metallic silicon has a boron content of, desirably, not more than 100 ppm and, specifically, not more than 50 ppm.

As hydrogen for the above reaction, use is made of at least part of the waste gas after the chlorosilane compounds are separated by condensation from the reaction formed gas in the first production process. As the hydrogen source other than the waste gas, there can be used hydrogen of various kinds which are industrially available. Hydrogen discharged in the step of producing polysilicon can also be used by being suitably refined. Hydrogen of these kinds, too, is used being mixed into the above waste gas.

It is, further, desired to conduct the above reaction by using a catalyst from the standpoint of increasing the rate of reaction and producing trichlorosilane efficiently and at a high selectivity. As the catalyst, there can be used those that have heretofore been used in the above reaction system, e.g., copper type catalyst such as copper powder, copper chloride or copper silicide. It is, further, allowable to use these catalysts in combination with an iron component or in combination with an iron component and an aluminum component together. The catalyst is used in an amount of 0.1 to 40% by weight and, specifically, 0.2 to 20% by weight calculated as copper relative to metallic silicon.

A known reactor can be used to conduct the above reaction. For example, there can be used a fixed bed type reactor or a fluidized bed type reactor and, particularly desirably, the fluidized bed type reactor from such a standpoint that metallic silicon, tetrachlorosilane and hydrogen, which are the reaction species, can be continuously fed to continuously produce trichlorosilane.

The amounts of feeding the reaction species in the above process may be suitably determined by taking the kind and capacity of the reactor into account. The ratio of tetrachlorosilane and hydrogen is, usually, 1 mole of tetrachlorosilane and 1 to 5 moles of hydrogen and, more preferably, 1 mole of tetrachlorosilane and 1 to 3 moles of hydrogen. Their rate of feeding may be set to lie in a suitable range depending on the kind and capacity of the reactor. When the fluidized bed type reactor is used, for instance, the reaction species are fed at such a flow rate that a fluidized layer can be formed. Further, tetrachlorosilane and hydrogen may be fed being diluted with an inert gas that does not take part in the reaction, such as nitrogen gas or argon gas.

The reaction temperature in the second production process is suitably determined by taking the material and capacity of the production apparatus as well as the catalyst into consideration. The reaction temperature, however, is higher than the reaction temperature in the first production process, and is set to be, usually, in a range of 400 to 700° C. and, specifically, 450 to 600° C.

The above reaction in the second production process proceeds in the presence of chlorosilane compounds contained in the waste gas used as the hydrogen source, hydrogen chloride and boron, though the amounts of these components are small. Besides, trichlorosilane in the chlorosilane compounds is a reaction product, while boron and the like are contained in very small amounts and do not disturb the reaction. Upon removing tetrachlorosilane, therefore, these components remain contained in the reaction formed gas in the process.

Besides, the rate of the above reaction is smaller than the rate of the reaction in the first production process which by-produces hydrogen. In conducting the reaction in the second production process, therefore, the ratio of the waste gas used as the hydrogen source can be very increased by setting the amount of metallic silicon that is used to be smaller than the amount thereof used in the first production process. In other words, it is desired that metallic silicon is used by the first production process in an amount larger than the amount of metallic silicon used in the second production process. Concretely, the amount of metallic silicon used in the first production process is set to be not less than 1.8 times as large and, specifically, not less than 2.0 times as large as the amount thereof used in the second production process so that nearly the whole amount of hydrogen can be supplied by the waste gas making it possible to greatly lower the cost.

The reaction formed gas in the second production process contains trichlorosilane that is formed, unreacted tetrachlorosilane, hydrogen, as well as chlorosilane compounds and boron stemming from the waste gas. The reaction formed gas is passed through a suitable filter like that of the first production process to remove solid matter such as metallic silicon particles. Thereafter, the reaction formed gas is cooled and condensed to separate the chlorosilane compounds therefrom and, next, the condensed solution is distilled to recover trichlorosilane in a highly pure form.

Namely, in separating the chlorosilane compounds by condensation, the temperature for cooling the reaction formed gas may be lower than a temperature at which the chlorosilane compounds condense, and is suitably determined by taking the cooling capacity and the like of the cooling apparatus into consideration to be, usually, not higher than −10° C. and, specifically, not higher than −30° C. The same also holds for the pressure at the time of separation by condensation; i.e., the pressure is, usually, set to be not lower than 300 kPaG and, specifically, not lower than 500 kPaG, and the chlorosilanes are separated by condensation by being cooled in the same manner as that of the first production process.

The chlorosilane compounds recovered by condensation include tetrachlorosilane and dichlorosilane in addition to trichlorosilane that is formed, and these chlorosilane compounds are separated from trichlorosilane by distillation.

For instance, tetrachlorosilane separated here is reused for the second production process while trichlorosilane is used as the starting material for precipitation in the step of producing polysilicon like in the first production process.

The waste gas that remains after the chlorosilane compounds are separated by condensation from the reaction formed gas comprises chiefly hydrogen and hydrogen chloride, and can be recycled into the second production process. The waste gas, however, contains, though in very small amounts, boron and the like that are not desired for trichlorosilane that is used for producing polysilicon. Therefore, if the waste gas is continuously circulated in the second production process, boron and the like accumulate in the gas that circulates in the process. It is, therefore, recommended to measure the contents of boron and the like in the waste gas by using a gas chromatography or the like and discard the waste gas if the concentrations thereof exceed predetermined values.

According to the present invention as described above, the first production process and the second production process are conducted in parallel, and the waste gas generated in the first production process is reused by being continuously and directly fed to the second production process without passing it through a special refining treatment or without the need of providing a storage vessel.

EXAMPLES

The invention will now be described by way of Examples to which only, however, the invention is in no way limited.

Metallic silicon, trichlorosilane that was obtained and waste gas were analyzed by the methods described below.

Analysis of Metallic Silicon:

A solution for analysis was prepared by dissolving metallic silicon in the hydrofluoric nitric acid followed by vaporization to dryness, and was analyzed by using an ICP (inductively coupled plasma) emission spectroanalyzer.

Analysis of Trichlorosilane:

A solution for analysis was prepared by trapping boron by using a known boron-trapping agent followed by vaporization to dryness, and was analyzed by using the ICP (inductively coupled plasma) emission spectroanalyzer.

Example 1

As a starting material for production, there was provided metallic silicon containing 0.03% by weight of boron, 0.51% by weight of Fe and 0.32% by weight of Al.

First Production Process:

By using a stainless steel fluidized bed type reactor having an inner diameter of 298 mm, metallic silicon was reacted with hydrogen chloride to prepare trichlorosilane.

Namely, 18 kg of metallic silicon was fed into the reactor. Thereafter, 17 kg (460 moles)/hr of hydrogen chloride and 0.91 kg (4 60 moles)/hr of hydrogen were fed to the reactor being mixed together. Here, the reaction temperature was set to be 350° C., and metallic silicon was fed at a rate of 4.3 kg (150 moles)/hr under the atmospheric pressure.

The reaction formed gas discharged from the reactor was cooled through a heat exchanger, pressurized up to 650 kPaG by a compressor and was then cooled down to −30° C. to remove chlorosilane compounds by condensation. The waste gas after the chlorosilane compounds were removed by condensation possessed the following composition.

Hydrogen: 99.0% by volume
Chlorosilane compounds: 1.0% by volume
Dichlorosilane: 0.1% by volume
Trichlorosilane: 0.8% by volume
Tetrachlorosilane: 0.1% by volume Second Production Process:

By using a stainless steel fluidized bed type reactor having an inner diameter of 298 mm, trichlorosilane was prepared by reacting tetrachlorosilane, the above metallic silicon and hydrogen in parallel with the above first production process.

Namely, 35 kg of metallic silicon and 2 kg of a catalyst (copper chloride (I)) were fed to the reactor. Thereafter, 215 kg (1.3 kilomoles)/hr of tetrachlorosilane and 6.4 kg (3.2 kilomoles) of hydrogen were fed into the reactor. Here, the reaction temperature was set to be 500° C., the pressure was set to be 0.7 MPaG, and metallic silicon was fed at a rate of 2.3 kg (82 moles)/hr.

The reaction formed gas discharged from the reactor was cooled through the heat exchanger and was, further, cooled down to −30° C. to remove chlorosilane compounds by condensation. The gas after the chlorosilane compounds were removed by condensation possessed the following composition.

Hydrogen: 99.0% by volume
Chlorosilane compounds: 1.0% by volume
Dichlorosilane: 0.1% by volume
Trichlorosilane: 0.8% by volume
Tetrachlorosilane: 0.1% by volume The gas was reused being circulated into the second production process.

After the reaction in the first production process and the reaction in the second production process have been stabilized, the chlorosilane compounds were separated by condensation from the reaction formed gas in the first production process, and the resulting waste gas was fed into the reactor of the second production process at a rate of 400 g (200 moles)/hr calculated as hydrogen. Hydrogen further necessary for the production was fed from the gas that was circulating in the second production process.

The reaction of the first production process and the reaction of the second production process were continued as described above for 50 hours, and the condensed solutions of chlorosilane compounds obtained by these processes were mixed together and analyzed to learn that the mixed solution possessed the following composition.

Dichlorosilane: 0.3% by volume
Trichlorosilane: 26.7% by volume
Tetrachlorosilane: 73.0% by volume The boron concentration was 360 ppma (parts per million atomic), and no large variation was seen during the experiment.

Thereafter, the condensed solution was distilled to obtain trichlorosilane of a high purity. The boron concentration in this case was less than 1 ppba (parts per billion atomic).

Example 2

As a starting material for production, there was provided metallic silicon containing 0. 1% by weight of boron, 0.51% by weight of Fe and 0.32% by weight of Al.

The first production process and the second production process were continued in quite the same manner as in Example 1 for 50 hours but using the above metallic silicon, and the condensed solutions of chlorosilane compounds obtained by these processes were mixed together and analyzed to learn that the mixed solution possessed the following composition.

Dichlorosilane: 0.3% by volume
Trichlorosilane: 26.7% by volume
Tetrachlorosilane: 73.0% by volume The boron concentration was 1300 ppma, and no large variation was seen during the experiment.

Thereafter, the condensed solution was distilled to obtain trichlorosilane of a high purity. The boron concentration was less than 1 ppba.

Reference Example 1

The first and second production processes were carried out in quite the same manner as in Example 1 but using, in the second production process and as hydrogen, pure hydrogen instead of using the waste gas from the first production process.

After the chlorosilane compounds were removed by condensation from the reaction formed gas in the reactor of the first production process, the waste gas possessed the following composition.

Hydrogen: 99.0% by volume
Chlorosilane compounds: 1.0% by volume
Dichlorosilane: 0.1% by volume
Trichlorosilane: 0.8% by volume
Tetrachlorosilane: 0.1% by volume In quite the same manner as in Example 1, further, the first production process and the second production process were continued for 50 hours. The condensed solutions of chlorosilane compounds obtained by these processes were mixed together and analyzed to learn the mixed solution possessed the following composition.

Dichlorosilane: 0.3% by volume
Trichlorosilane: 26.7% by volume
Tetrachlorosilane: 73.0% by volume The boron concentration was 360 ppma, and no large variation was seen during the experiment.

Thereafter, the condensed solution was distilled to obtain trichlorosilane of a high purity. The boron concentration was less than 1 ppba.

The results of experiments tell that when the waste gas from the first production process is directly used as the hydrogen source as in Examples 1 and 2, trichlorosilane can be produced in the same manner as when pure hydrogen is used.

The invention claimed is:

1. A process for producing trichlorosilane, including, independently from each other, a first production process for forming said trichlorosilane by reacting metallic silicon with hydrogen chloride and a second production process for forming said trichlorosilane by reacting metallic silicon with tetrachlorosilane and hydrogen; wherein said trichlorosilane and other chlorosilane compounds are separated by condensation from trichlorosilane-containing gases formed by reaction in said first production process, and waste gases from which said trichlorosilane and other chlorosilane compounds have been separated by condensation are continuously fed without being refined as a hydrogen source to the second production process, wherein the metallic silicon is used in the first production process in an amount not less than twice as much as the amount of the metallic silicon used in the second production process.

2. The process for producing trichlorosilane according to claim 1, wherein said trichlorosilane is separated by condensation from trichlorosilane-containing gases formed by reaction in said second production process.

* * * * *